US010586959B2

(12) United States Patent
Tschiggfrei et al.

(10) Patent No.: US 10,586,959 B2
(45) Date of Patent: Mar. 10, 2020

(54) BATTERY BLOCK, AND METHOD FOR PRODUCING A BATTERY BLOCK

(71) Applicant: H-TECH AG, Schaan (LI)

(72) Inventors: Peter Tschiggfrei, Tisis (AT); Gerd Skala, Frastanz (AT)

(73) Assignee: H-Tech Aq, Schaan (LI)

( * ) Notice: Subject to any disclaimer, the term of this patent is extended or adjusted under 35 U.S.C. 154(b) by 1 day.

(21) Appl. No.: 15/561,320

(22) PCT Filed: Aug. 25, 2015

(86) PCT No.: PCT/EP2015/069421
§ 371 (c)(1),
(2) Date: Sep. 25, 2017

(87) PCT Pub. No.: WO2016/155846
PCT Pub. Date: Oct. 6, 2016

(65) Prior Publication Data
US 2018/0102519 A1   Apr. 12, 2018

(30) Foreign Application Priority Data

Mar. 27, 2015 (DE) .......................... 10 215 104 741

(51) Int. Cl.
*H01M 2/00* (2006.01)
*H01M 2/10* (2006.01)
(Continued)

(52) U.S. Cl.
CPC ....... *H01M 2/1077* (2013.01); *H01M 2/1016* (2013.01); *H01M 2/1083* (2013.01);
(Continued)

(58) Field of Classification Search
CPC ........... H01M 2/1077; H01M 10/0468; H01M 2/1083; H01M 2/206; H01M 2/1016;
(Continued)

(56) References Cited

U.S. PATENT DOCUMENTS

2007/0188147 A1* 8/2007 Straubel ................ H01M 2/202
320/134
2010/0310919 A1* 12/2010 Villarreal ............ H01M 2/1077
429/120

(Continued)

FOREIGN PATENT DOCUMENTS

CN   101803067 A   8/2010
CN   102460769 A   5/2012
(Continued)

*Primary Examiner* — Nicholas P D'Aniello
(74) *Attorney, Agent, or Firm* — Vorys, Sater, Seymour and Pease LLP

(57) ABSTRACT

The present invention relates to a battery block comprising at least two battery packs and a method for manufacturing a battery block. There is provided a battery block (10), comprising: at least two battery packs (10a, 10b, 10c, 10d, 10e), wherein each battery pack comprises at least two battery cells (11), wherein the battery cells (11) of the battery pack have electrically positive connection terminals (33) on one side and the electrically negative connection terminals (34) of the battery cells (11) are arranged on the opposite side of the battery pack, wherein a connection structure (14) is associated to each electrical connection side of a battery pack and the electrical connection terminals (33, 34) of the battery cells (11) of the battery pack each are connected to the associated connection structure (14), wherein the connection structures (14) of two neighboring battery packs (10a, 10b) that are electrically polarized in an opposite way lie against each other in order to achieve a large area connection between the battery packs (10a, 10b).

16 Claims, 10 Drawing Sheets

(51) Int. Cl.
*H01M 2/20* (2006.01)
*H01M 10/04* (2006.01)

(52) U.S. Cl.
CPC ......... *H01M 2/1094* (2013.01); *H01M 2/202* (2013.01); *H01M 2/206* (2013.01); *H01M 10/0468* (2013.01); *H01M 2/105* (2013.01); *H01M 2220/20* (2013.01)

(58) Field of Classification Search
CPC .............. H01M 2/1094; H01M 2/202; H01M 2220/20; H01M 2/105
See application file for complete search history.

(56) References Cited

U.S. PATENT DOCUMENTS

2013/0224532 A1    8/2013  Bengtsson et al.
2015/0086823 A1*   3/2015  Liew .................. H01M 2/1083
                                                              429/99

FOREIGN PATENT DOCUMENTS

| | | |
|---|---|---|
| CN | 102468460 A | 5/2012 |
| CN | 106415882 A | 2/2017 |
| DE | 10 2010 013 022 A1 | 9/2011 |
| DE | 10 2013 100 545 A1 | 7/2014 |
| WO | 2009/011539 A2 | 1/2009 |
| WO | 2013/137707 A1 | 9/2013 |

\* cited by examiner

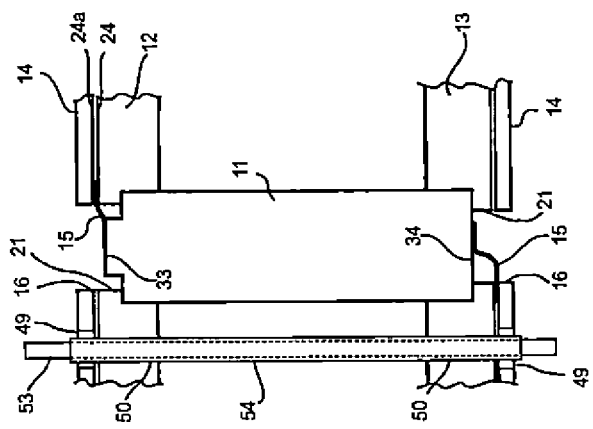
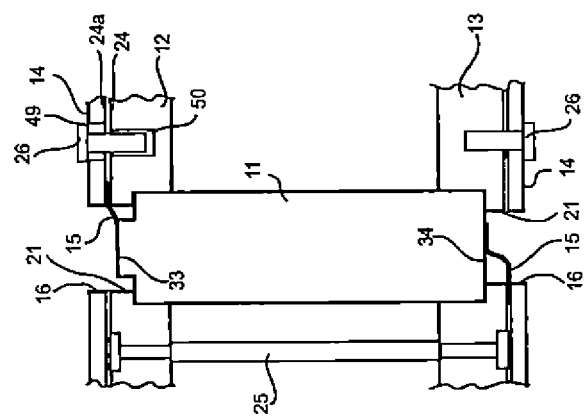

BATTERY BLOCK, AND METHOD FOR PRODUCING A BATTERY BLOCK

BACKGROUND OF THE INVENTION

The present invention relates to a battery block comprising at least two battery packs, and to a method for manufacturing a battery block.

Battery blocks are used in various electrically powered devices, in particular in electric vehicles, in electrically driven bicycles, in battery-powered tools, or portable battery cases. Typically, multiple battery packs are used in such battery blocks, wherein each battery pack comprises several battery cells. Rechargeable battery cells, in particular lithium-based rechargeable battery cells, are frequently used in such battery packs of which the battery block is made up. However, the invention is neither limited to rechargeable battery cells, nor to lithium-based battery cells and may be implemented in any way. Rechargeable batteries or accumulators are characterized in that they may be recharged again after a first discharge process. However, this requires an appropriate control of the charging and discharging process, by a battery management system, for example.

When using multiple battery cells within a battery pack and combining multiple battery packs in a battery block, it is very important to form the electrical connections between the individual battery cells and the battery pack and between the individual battery packs in a reliable manner. These different electrical connections must function reliably both during operation of the electrical device, i.e., under corresponding mechanical, thermal and electrical stresses, and throughout the life span of the electrical device. When using multiple battery packs in one battery block, which can thus comprise several hundred battery cells, large currents occur during charging and discharging, which flow, when interconnecting multiple battery packs, in particular at the connection regions. Where large currents flow, a lot of heat is also generated, the uncontrolled transfer of which to the battery cells must be avoided, since battery cells, in particular lithium-based cells, can outgas or even explode in case of uncontrolled addition of heat.

Thus, in the prior art, various technologies are used in order to prevent an excessive influence of heat on the battery cells both during assembly of the battery pack and during the charging and discharging process. One approach for preventing an excessive thermal stress of battery packs and the battery cells within a battery pack consists in constructing the spatial dimensions of the battery pack in a liberal manner, such that sufficiently great distances between the individual battery cells exist. In a similar manner, when interconnecting multiple battery packs to a battery block, cables between the individual battery packs are used in order to interconnect these battery packs. The permanent need for reducing the size of electrical devices, in order to have more storage space or a bigger passenger cabin in an electrical vehicle, speaks against a more liberal spacious partitioning with more volume. Thus, there exist many efforts to compress the interconnection of battery cells in battery packs and the interconnection of multiple battery packs to battery blocks as much as possible, such that very many cells can be installed in a minimal volume. A further aspect of the design of battery blocks being assembled from at least two battery cells is that individual battery cells among the many battery cells within one battery pack may fail during operational life due to inhomogeneities within the cells, wherein the failure is caused by a low internal resistance and thus results in an increased current flow at the connection structures of the battery packs and at the connection regions of the battery block. This increased current flow may result in an uncontrolled heat generation in the cell and also in the neighboring cells, which can also lead to a chain reaction, such that the whole battery pack outgases in an uncontrollable manner or explodes. To avoid such effects, it is necessary to design the battery packs being interconnected to a battery block such that they are simple to produce and have a reliable electrical contact by their corresponding design both during operation and for withstanding the mechanical and thermal stresses. Further, the battery block with the several battery packs should have a space optimized arrangement which allows for flowing of very large currents without leading to a thermal overload of the individual cells.

At the same time, the failure of an individual cell must not lead to the failure of the battery pack or the battery block. Further, the replacement of defect battery packs or battery cells should generally be enabled.

SUMMARY OF THE INVENTION

Therefore, the object of the invention is to provide a battery block which is simple to manufacture, is scalable with regard to its dimensions and the number of installed battery packs and battery cells, provides a sufficient heat dissipation during assembly and during operation, enables a reliable electrical connection between the battery packs and between the connection structures of the battery packs and the individual battery cells and the failure of individual battery cells, and enables a simple replacement of a defect battery pack.

The object is solved by the features of the independent claims. Advantageous embodiments are learned from the dependent claims.

The invention is based on the idea of designing a battery block with regard to its outer dimensions and its outer wiring such that it is possible to stringing together at least two battery packs in a way that preferably no further connection elements between the individual battery packs are necessary which, due to their decreased cross-sectional area, would not withstand a higher current load or would represent a limitation for a higher current flow.

Moreover, it is prevented by the battery block according to the invention that, when interconnecting the battery packs, further contact points between the battery packs are created which would constitute a contact resistance in their electrical connection and could fail.

According to the invention, two battery packs are interconnected such that the outside connection structures of two neighboring battery packs lie against each other such that a large scaled area connection of the connection terminals is possible without further electrical connection elements. That is, a battery pack comprises at its upper side and lower side an large area connection structure, in the form of a plate, for example, which tolerates a high current flow of the individual cells within a battery pack. These connection structures of the battery packs are arranged lying against each other such that a reliable current flow from the one battery pack to the other neighboring battery pack is possible. This is ensured by pressing two battery packs against each other. The pressure may either be provided by a corresponding pressing mechanism, by at least one pressing rod which runs parallel to a longitudinal axis of the battery cells or around the battery cells, for example. The pressing mechanism may also be arranged around the outer circumference of the multiple battery packs, in the shape of a tension band. It is also possible to arrange tension bands at the outer edges of the battery packs in order to apply a corresponding pressure on the multiple battery packs, such that the connection structures are pressed against each other. Alternatively, the pressure may be provided by an external housing which hold the multiple battery packs, such that the connection terminals lying outside of neighboring battery packs are pressed against each other in order to thereby ensure a reliable current flow from one battery pack to the next battery pack.

Therefore, according to the invention, one battery block comprises at least two battery packs, wherein each battery pack comprises at least two battery cells. Each battery cell of the battery pack has an electrically positive connection terminal on a first side, wherein the electrically negative connection terminal is arranged on the opposite side of the battery pack. Each electrical connection side of a battery pack is associated with a connection structure, wherein the electrical connection terminals of the battery cells of the battery pack each are electrically connected to the associate connection structure.

According to the invention, the connection structures of two neighboring battery packs that are electrically polarized in an opposite way lie against each other such that a large area connection between the battery packs is achieved. This requires a flat and conductive outer structure of a battery pack. By this way only, a large area contact between battery packs can result without a tapering cross-sectional area limiting a current flow.

Depending on the orientation of the battery packs, the longitudinal axes of the battery cells may therefore run horizontally, wherein, in this case, the connection structures are arranged vertically with respect to the horizontal orientation of the battery cells. Yet, according to the embodiment of the battery packs according to the invention, it is also possible to arrange the connection structures essentially horizontally with the longitudinal axes of the battery cells running vertically. In case of such an arrangement, a reliably high pressure is already applied to the underlying battery pack by the stacking of two battery packs and their weight, so, one may already speak about a large area electrical connection between the two battery packs in this case.

The battery packs that are interconnected to a battery block are connected in series or in line. The individual battery cells in one battery pack are connected in parallel. Preferably, the battery packs of the battery block are pressed against each other by pressure on the external battery packs. As already mentioned above, this pressure may be provided in different ways. For this purpose, different embodiments will be described below. When interconnecting at least two battery packs connected in series electrically opposite connection terminals of the battery cells are located on the opposite outer sides of the battery block, i.e. the electrically negative connection terminals are located on one side of the battery block and the electrically positive connection terminals are located on the other outer side of the battery block. At this time, the two neighboring battery packs are interconnected such that the electrically positive connection terminals of one battery pack are in connection with the electrically negative connection terminals of the neighboring battery packs via the correspondingly associated connection structures.

Preferably, the at least two battery packs that are interconnected to one battery block are pressed against each other by a pressing means, in particular a pressing rod. In order to achieve a large area connection between the connection structures of the respective neighboring battery packs, the number of the required pressing rods depends, on the one side, on the application area of the battery block and, on the other side, depends on the amount of battery cells within one battery pack.

The arrangement of the cells within one battery pack may be adapted to the geometrical requirements and the storage space which is available for receiving the battery block. Depending on the geometrical shape of a battery pack, more or less pressing rods may be used in order to achieve a sufficient contact pressure on the neighboring battery packs of one batten block.

Preferably, a pressing rod comprises an insulating coating in order to avoid an electrical short circuit with the connection structures and the electrical connection terminals of the battery cells. However, it is also possible to form the pressing rod from an insulating material.

The pressing rod or the pressing means may either run through or penetrate the battery packs of the battery block or may be arranged at the edge region of the battery pack, and be arranged around the number of battery packs of the battery block in order to apply a corresponding pressure on the individual battery packs in order to achieve a good contact between the connection structures.

Preferably, the pressing rod or the pressing means comprises fastening means or may be connected thereto which are necessary for pressing the at least two battery packs against each other. These means may be realized by nuts, spring elements, clamp screws, tension belts, clamping brackets and/or holding clips.

Each battery pack comprises a first and a second connection structure, wherein these connection structures each have a passage opening for receiving the at least one pressing rod.

In order to respectively connect a battery block in the device intended therefor, each outer side of the assembled battery packs is provided with a contact plate which comprises a connection region for connecting the battery block to a charging device or to an electrical load. Therefore, the contact plate is preferably made from an electrically conductive material and lies in a large area against the connection structure of the respective external battery pack.

In a preferred embodiment, the contact plate has dimensions similar to the connection structure and, however, protrudes from the dimensions of a battery pack in a region in order to have an electrical connection region which is accessible from outside. Similarly to the connection structures, the contact plate also has one passage hole provided for receiving the pressing rod. In case that multiple pressing rods are necessary for pressing multiple battery packs against each other, the contact plate also has a corresponding number of passage holes that align with the passage holes of the connection structures in the assembled state.

In a battery block which is assembled from at least two battery packs, wherein one battery pack comprises multiple battery cells, vey high currents flow during the charging and discharging process. Therefore, in a preferred embodiment, it is intended to arrange an electrically insulating pressure plate on the outer sides of the battery block on which a contact plate is located, respectively. This electrically insulating pressure plate completely covers the contact plate. The battery block may thereby be safely handled. The pressure plate may also leave the connection region of the contact plate exposed. In correspondence to the contact plate and the connection structures, the pressure plate also has at least one passage hole which aligns with the passage hole of the contact plate and the passage openings of the connection structures in order to receive the at least one pressing rod.

Thus, in the most simple embodiment, a battery block results which is assembled from at least two battery packs, wherein each battery pack includes two connection structures arranged at two opposite sides which are each connected with the electrical terminals of the battery cells, wherein the inner connection structures of the two battery packs are pressed against each other and the two outer connection structures of the battery packs each are connected vie a large area with a contact plate. Via the two outer pressure plates and at least one pressing rod the two battery packs and the contact plates are pressed against each other such that an large area scaled electrical contact is ensured between the outer connection structures and the contact plates and between the two connection structures firmly pressed against each other between the battery packs.

The pressing rod preferably runs parallel to the longitudinal axis of the battery cells, wherein at least one end portion of the at least one pressing rod protrudes from the outer sides of the battery pack. Preferably, the one end portion protrudes from the outer sides of the battery block that are limited by the pressure plates. That is, in one embodiment, it is possible that the pressing rod protrudes at both sides both from the battery packs lying next to each other or neighboring and from the contact plates and pressure plates located at the outer sides of the battery packs.

A battery pack comprises at least one holding structures for receiving the at least two battery cells. At this time, the holding structure is made from an electrically insulating material and allows for a fixation of the battery cells within the battery pack.

According to a preferred embodiment, there is provided a holding structure having a surface that supports the connection structure, wherein the connection structure is connected to the electrically negative or to the electrically positive connection terminals of the battery cells. In order to connect to battery packs to each other, the holding structure also has a passage opening through which a pressing rod may be passed.

Moreover, the holding structure has connection openings and receiving openings, wherein the battery cells are inserted into the receiving openings and the battery cells may be connected to the connection structure via a connection element through the connection opening.

In order to avoid an electrical short circuit in case of damage of an element of a battery block, it is preferred that the passage opening in the holding structure has a smaller diameter than the passage opening of the connection structures or the passage holes of the contact plate. It is thereby ensured that even in case of a damaged insulating coating of the pressing rod there is enough space between the pressing rod and the connection structures in order to avoid an electrical short circuit.

Preferably, in a battery pack, a first holding structure is located on the side of the electrically positive connection terminals and a second holding structure is located on the side of the electrically negative connection structure. The electrically positive connection terminals of the battery cells are each connected to a first connection structure of the battery pack with a connection element and the electrically negative connection terminals each are arranged at a second connection structure with a connection element, wherein the first and the second connection structure each is associated to the first and the second holding structure and rest on the outer side of this holding structure.

Preferably, the connection structures are formed by having a large scaled area and thereby allow a current flow corresponding to the sum of the individual currents of the battery cells within a battery pack.

The connection structures are made from an electrically conductive material. Preferably, the connection structures completely or almost completely cover the holding structures. By forming the connection structures in a extensive or flat manner, a uniform current distribution to all connected battery cells is ensured. The maximal current conductivity is defined by the cross-sectional area of the connection structure and the respective surface, i.e. by the volume necessary for conducting the current. Since over one hundred battery cells may be installed in such a battery pack and each battery cell may provide high currents for a short period, the respective connection structures must provide a sufficiently high current capacity which corresponds to the sum of the individual currents of the individual battery cells. That is, during the charging process, and in particular during the discharging process, over 100A flow via the connection structures in case of a maximum request. Preferably, the connection structure is formed from a metal. In this case, the usage of copper is preferred. However, it is also possible to make the connection structure from a different electrically conductive material, such as aluminum. The connection element used for establishing the connection between the connection structure and the electrical connection terminal of the battery cell is made from a second different metal, nickel or aluminum for example. At this time, the usage of a hilumin band is preferred. However, it is also possible to use a different electrically conductive material for the connection elements.

To this purpose, the connection structure preferably has a surface which corresponds at least to the sum of the cross-sectional areas of the battery cells comprised in the battery pack.

Preferably, the length of a connection structure may be greater than the sum of the individual lengths or the individual diameter of the battery cells in longitudinal direction. On the other hand, the width of the connection structure may be greater than the sum of the individual widths or the individual diameter of the battery cells in width direction. Hence, the connection structure almost covers the complete surface of the holding structure in which the individual battery cells are inserted. At this time, however, it is preferred that the holding structure has a small protrusion from the connection structure in order to thereby avoid that an electrically conductive element protrudes to the outside.

The battery cells of the battery pack preferably are fastened or fixed in the first and second holding structure, wherein the first and second holding structure are fixed to each other by a first fastening element. It is thereby ensured that the two holding structures are fixed with regard to their orientation and their distance to each other and can thereby receive the battery cells within the first holding structure. Thus, the first fastening element may be used as a spacer between the holding structures. Preferably, the first fastening element is electrically insulating and may be fastened through the holding structures by means of screws or other fixing materials.

The connection structures may be fastened to the holding structure with a second fastening element. Preferably, the second fastening element should also be electrically insulating. Preferably, holding structure may further have a blind hole in which a screw may be screwed which fastens the connection structure to the holding structure. However, the second fastening element for fastening the connection structure to the holding structure may be omitted, since the connection elements for connecting to the electrical connection terminals of the battery cells are mounted to the inner surface of the connection structure in a first step and then are mounted to the connection terminals of the battery cells by spot-welding or soldering such that, due to the plurality of contacts, the connection structure is safely supported by the holding structure.

That is, a battery pack comprises multiple battery cells each of which has an electrically positive and an electrically negative connection terminal. A connection element is associated to each of these electrically positive and electrically negative connection terminals, wherein the connection elements which are connected to the electrically negative connection terminals of the cells are connected to a connection structure and the connection element which are connected to the electrically positive connection terminals of the battery cells are connected to the other connection structure. At this time, the connection elements are fastened to a side of the connection structure facing the holding structure in order to thereby be mechanically supported and further to allow that the connection structure has a flat surface at its outer side which allows that two connection structures lie or press against each other for interconnection in a battery block.

Preferably, the connection element is located between the holding structure and the connection structure and protrudes into the receiving opening of the holding structure.

The above-mentioned object is also solved by a method for manufacturing a battery block. To this purpose, two completed battery packs are provided, wherein each battery pack at least comprises two battery cells. The battery cells of the battery pack comprise on one side electrically positive connection terminals and on a second side the electrically negative connection terminals which are arranged at the opposite side of the battery pack, wherein respectively one connection structure is associated to each electrical connection side of the battery pack and the electrical connection terminals of the battery cells of a battery pack each are connected to the associated connection structure, wherein neighboring battery packs of the battery block are pressed against each other so that connection structures of two neighboring battery packs that are electrically polarized in an opposite way lie against each other in order to ensure an large area connection between the neighboring battery packs.

According to a first embodiment of the method, two battery packs are arranged to each other such that the connection structures facing each other touch, wherein a pressing mechanism is then mounted which presses the two battery packs against each other. Preferably, at this time, a pressing rod is passed through the passing openings which preferably protrudes from the outsides of the at least two battery packs. Respectively one contact plate is put on the respective outsides of the two battery packs pressing against each other, wherein the pressing rod passes through the respective passing holes of the contact plate. Then, an electrically insulating pressure plate is put on the outer contact plate, respectively, through which the at least one pressing rod passes. The two outer pressure plates now are tightened or pressed against each other using fastening means so that a large area contact between the connection structures of the battery packs and the contact plates occurs.

According to an alternative method, first, the at least one pressing rod is passed through the one pressure plate, then, a first contact plate is put onto the pressing rod protruding from the pressure plate. Then, at least two battery packs are put onto the at least one pressing rod and moved in direction of the pressure plate and the contact plate. A second contact plate is put on the other side of the battery block which tightly lies against the outer connection structure of the battery pack that was put on last and which is also penetrated by the pressing rod. At last, a second electrically insulating pressure plate is put on the second contact plate, wherein the first and second pressure plate with the contact plates and the at least two battery packs arranged therebetween are pressed against each other by means of the fastening means such that a reliable electrical contact between the connection structures and the contact plates is provided.

BRIEF DESCRIPTION OF THE DRAWINGS

In the following, embodiments of the present invention are described in detail by means of the drawings. In the drawings are shown:

FIG. 3a a sectional view through a battery pack according to the invention which illustrates the fastening of a battery cell between two holding structures according to an embodiment of the present invention;

FIG. 3b a sectional view through a battery pack according to the invention which illustrates a battery cell according to another embodiment between two holding structures;

DETAILED DESCRIPTION OF THE PREFERRED EMBODIMENTS

Figure 1:
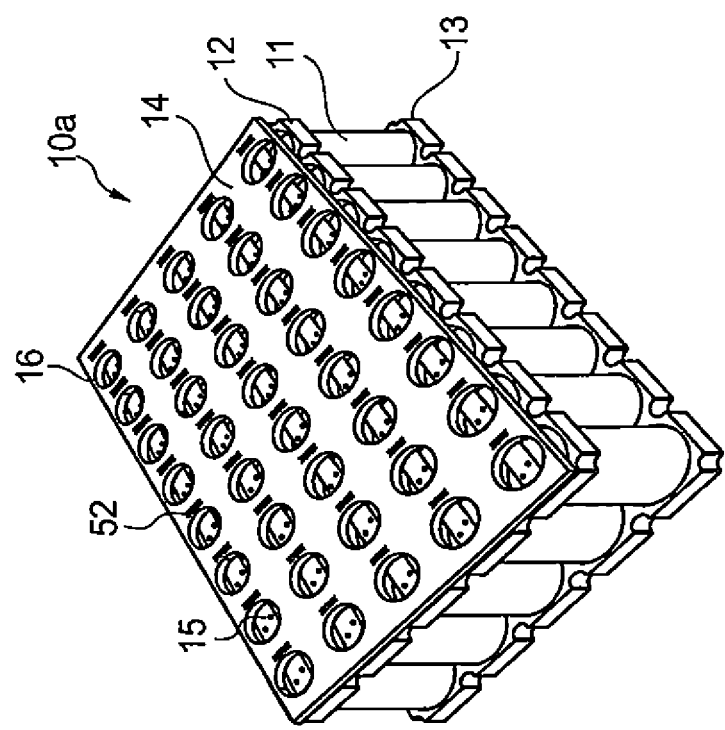
FIG. 1 a perspective view of a battery pack according to the invention.

In FIG. 1, a battery pack 10a according to the invention is illustrated, in which battery cells 11 which comprise lithium, for example, are fastened or fixed between a first holding structure 12 and a second holding structure 13. A connection structure 14 is supported by the holding structure 12, wherein the connection structure 14 comprises contact openings 16 via which the electrical contacts of the battery cells 11 are connected to connection elements 15. The connection elements 15 are mounted on one side of the connection structure 14, wherein this side of the connection structure 14 is supported by the side of the holding structure 12 which is directed upwards, such that the connection elements 15 are arranged between the connection structure 14 and the holding structure 12 and protrude into a receiving opening 21 of the holding structure 12 so as to be each connected to electrical connection terminals 33, 34 of the battery cells 11. The electrical terminals on the lower side of the battery cells 11 in the region of the second holding structure 13 are constructed similar to the connection structure 14 in the region of the first holding structure 12. The reference sign 52 designates the connection point of the connection element at the connection structure 14. The connection elements 15 formed as metal sheets are mounted to the connection structure 14 by friction welding, since a large area connection between the connection structure 14 and the respective connection elements 15 is thereby achieved and little heat is generated. At the electrical connection terminals 33, 34, the connection elements 15 are connected by means of spot-welding or soldering.

The connection elements 15 which are preferably formed as strips are mounted to the connection structure 14 by a joining process and each protrude into the respective contact opening 16. Friction welding or ultrasonic welding of the connection elements 15 to the respective connection structure 14 has proven as a particularly preferred connection method, since a sufficient mechanical and also electrical connection between the connection structure 14 and the connection element 15 is achieved by such a method. The generation of heat in case of friction welding is substantially lower than in case of a spot-welding method or soldering method. Moreover, in case of connecting a thicker material with a thinner material, it is more difficult to achieve a reliable mechanical and electrical connection by means of a spot-welding method, since the energy is absorbed by the thicker material. However, in case of friction welding, a flat or extensive connection on the respective surfaces of the materials to be connected is achieved. At this time the two surfaces to be connected together are moved relative to each other under pressure, whereby a temperature rise and plasticizing occur. Then, the surfaces to be connected together are pressed against each other. Thus, a reliable mechanical and also electrical connection can be achieved, also with regard to different material thicknesses and different materials. The connection structure 14 may have a substantially greater thickness than the connection element 15. Further, it is preferred to prefabricate the connection structures 14 with the correspondingly connected connection elements 15 such that these can be manufactured prior to the assembly of the battery pack 10a with the individual battery cells 11. After the connection structure 14 with the connection elements 15 mounted thereon each of which protrudes into the contact openings 16 has been arranged on the respective holding structure 12, 13, the electrical connection between the positive and negative connection terminals 33, 34 of the respective battery cells 11 may be established. Here, spot-welding or soldering is still possible, in order to ensure a reliable electrical connection of the electrical terminal of the battery cell 11 to the connection elements 15. The connection element 15 has a cross-sectional area which melts in case of a current above a maximum charging or discharging current, whereby the connection between the connection structure 14 and the connection element 15 is interrupted and a further current flow is thereby prevented. Moreover, it may be prevented that a cell 11 excessively heats up in case of failure and that the whole battery pack 10a becomes non-functional in case of a corresponding chain reaction and that dangerous situations occur. For thermal insulation, a heat insulating layer may be arranged between the connection structure 14 and the holding structure 12, 13, made from Teflon, for example.

Figure 2:
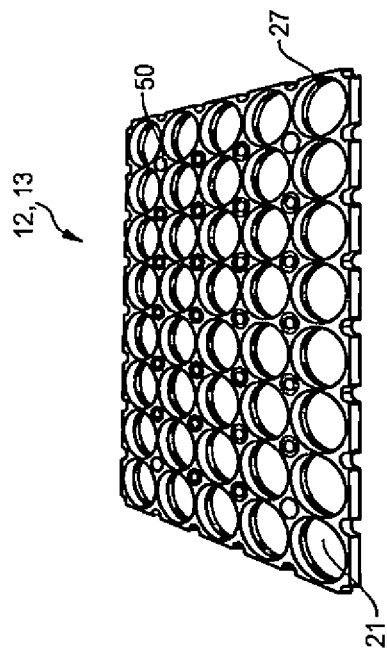
FIG. 2 a holding structure for a battery pack according to the invention.

The first and the second holding structure 12, 13 is illustrated in FIG. 2. The holding structure 12, 13 is made from an electrically insulating material and further has a plurality of receiving openings 21 into which the battery cells 11 are inserted. Preferably, the receiving openings 21 have a circumferential flange 27 by which the battery cell 11 is supported after insertion into the receiving openings 21. Further, the holding structures 12, 13 have a predetermined distance between the individual receiving openings 21 in order to thereby achieve a defined arrangement of the battery cells 11 relative to each other and to provide sufficient ventilation between the battery cells 11. Passage openings 50 are provided between the receiving openings 21 which are used for fastening the first and second holding structure 12, 13 to each other an for fastening several battery packs 10a to each other.

On one hand, FIG. 3a illustrates the mounting of the battery cell 11 to its electrically positive connection terminal 33 by means of the connection element 15 and the electrical connection to the electrically negative connection terminal 34 by means of a connection element 15 with the underlying connection structure 14. It can easily be seen that the connection element 15 is supported between the first holding structure 12 and the lower side of the upper connection structure 14 and that the lower connection element 15 is arranged between the second holding structure 13 and the lower connection structure 14.

On the left side of the cell 11, a first possible fastening alternative is illustrated. A fastening element 25 is provided between the two holding structures 12, 13 and fastened by two screws protruding through the holding structure 12, 13 and thereby fastens the holding structure 12, 13 with the battery cells 11 inserted therein.

Alternatively or furthermore, the connection structures 14 may be fastened via passage holes 49 in the connection structure 14 by means of second fastening elements 26, in the form of plastic screws or bolts 25 for example, in threaded holes of the first and second holding structure 12 and 13. In place of a plastic threaded bolt, rivets, plastic rivets for example, with a crimping connection may also be used in order to thereby fasten the connection structures 14 to the respective holding structures 12, 13. By means of the first fastening element 25, a predetermined distance between the holding structures 12, 13 can be adjusted such that the battery cells 11 between the first and second holding structure 12, 13 are safely fastened in the receiving openings 21 of the first and second holding structure 12, 13 and are not subject to mechanical stresses. In addition to fastening the first and second holding structure 12, 13 by means of the first fastening element 25, it is possible to fasten the battery cells 11 in the receiving opening 21 by means of adhesive, whereby assembly is facilitated and a rotation of the battery cells 11 prior to the connecting step with the connection elements 15 is prevented.

FIG. 3b shows a sectional view through a battery pack with a fastening element which allows a fastening of several battery packs 10a, 10b, 10c to each other. Both the first and the second holding structure 12, 13 each have a passage opening 50, wherein, correspondingly thereto, the connection structure 14 also has passage openings 49. After it has been arranged on the holding structure 12, 13, the passage openings 49 and 50 align with each other and thereby allow a pressing rod 53 to be passed through these passage openings 49 and 50.

The pressing rod 53 preferably comprises an electrically insulating coating 54, since it is passed through he electrically conductive connection structures 14 without touching them. In order to ensure prevention of a touch, the diameter of the passage hole 49 in the connection structures 14 is greater than the outer diameter of the coating 54 such that between the coating 54 and the connection structures 14 a gap is provided which also contributes to the prevention of an electrical contact of the connection structures 14 and the pressing rod 53. Thus, an electrical contact between the pressing rod 53 and the connection structures 14 even is avoided in case of failure of the coating 54, due to damage for example. The diameter of the passage openings 50 in the holding structures 12, 13 is smaller than the diameter of the passage opening 49 in the connection structures 14. Preferably, the diameter of the passage openings 50 in the holding structures 12, 13 is adapted to the outer diameter of the coating 54 such that the pressing rod 53 can be passed through the passage openings 50 without gap or play. Due to such a dimensioning of the passage openings 50, a centering is provided further to the pressure of the pressing mechanism which ensures that a mutual displacement of the connection structures 14 of respective battery packs is avoided, even in case of extremely high mechanical impacts. Thus, a reliable current flow from one battery pack to the next battery pack is ensured even in case of extreme conditions which can occur in vehicles, for example.

Figure 4:
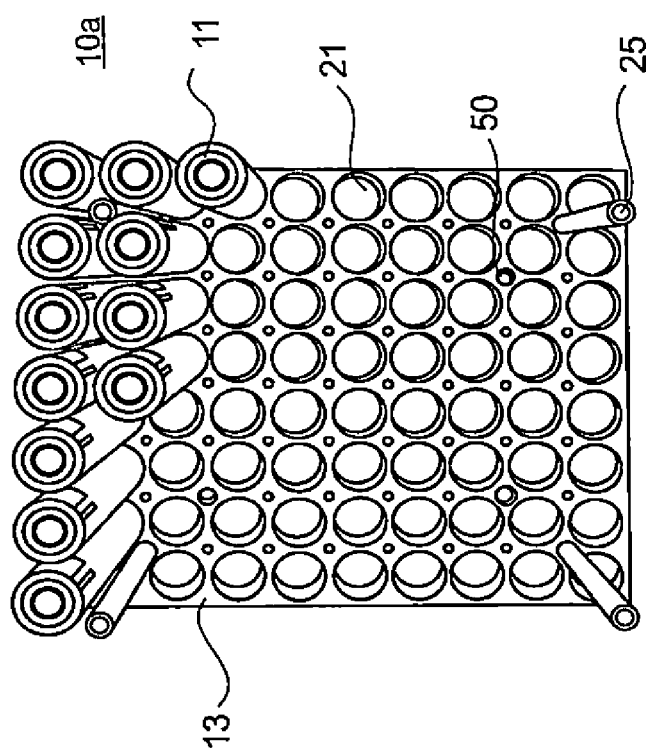
FIG. 4 a perspective view of a battery pack during mounting.

FIG. 4 shows the structure of a battery pack 10a during assembly. It is illustrated that individual battery cells 11 have already been inserted into the lower or second holding structure 13. Further, the holding structure 13 has already been provided with the first fastening elements 25 which allow a fastening with the second holding structure 12 not shown in FIG. 4.

Figure 5:
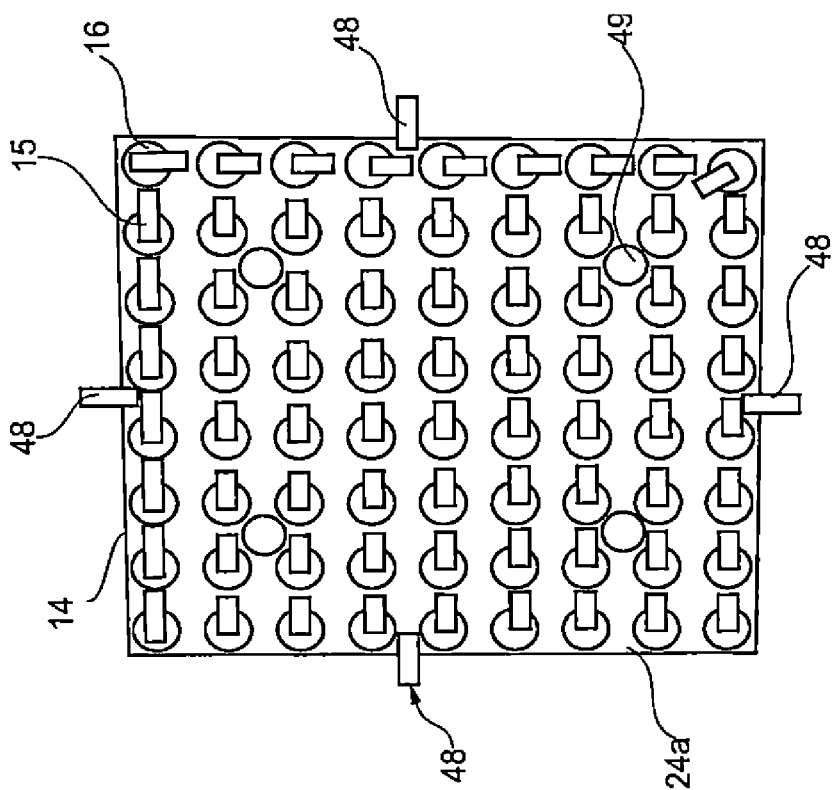
FIG. 5 a view of a connection structure from below.

FIG. 5 shows a connection structure 14 according to the invention. Here, a lower side 24a of the connection structure 14 is illustrated which is support by the upper side of the respective holding structure 12 or 13, as shown in FIGS. 3a and 3b. The connection structure 14 has contact openings 16. There are provided as many contact openings 16 as battery cells 11 to be inserted into the respective holding structures 12 and 13. Respective connection elements 15 preferably fastened to the lower side 24a of the connection structure 14 by friction welding protrude into these contact openings 16. The fastening of the connection elements 15 is carried out before the connection structure 14 with the connection elements 15 is mounted to the electrical connection terminals 33, 34 of the battery cells 11.

Moreover, the connection structure 14 illustrated in FIG. 5 has further terminals 48 allowing a connection to an operation management system. Further, the connection structure 14 according to FIG. 5 has passage holes 49 which are used for passing pressing rods 53 therethrough or for receiving first or second fastening elements 25, 26. At the same time, the number of the passage openings 49 in FIG. 5 is not limited to four. The various passage openings 49 for the first and second fastening elements 25, 26 or the pressing rod 53 may have different diameters.

Figure 6:
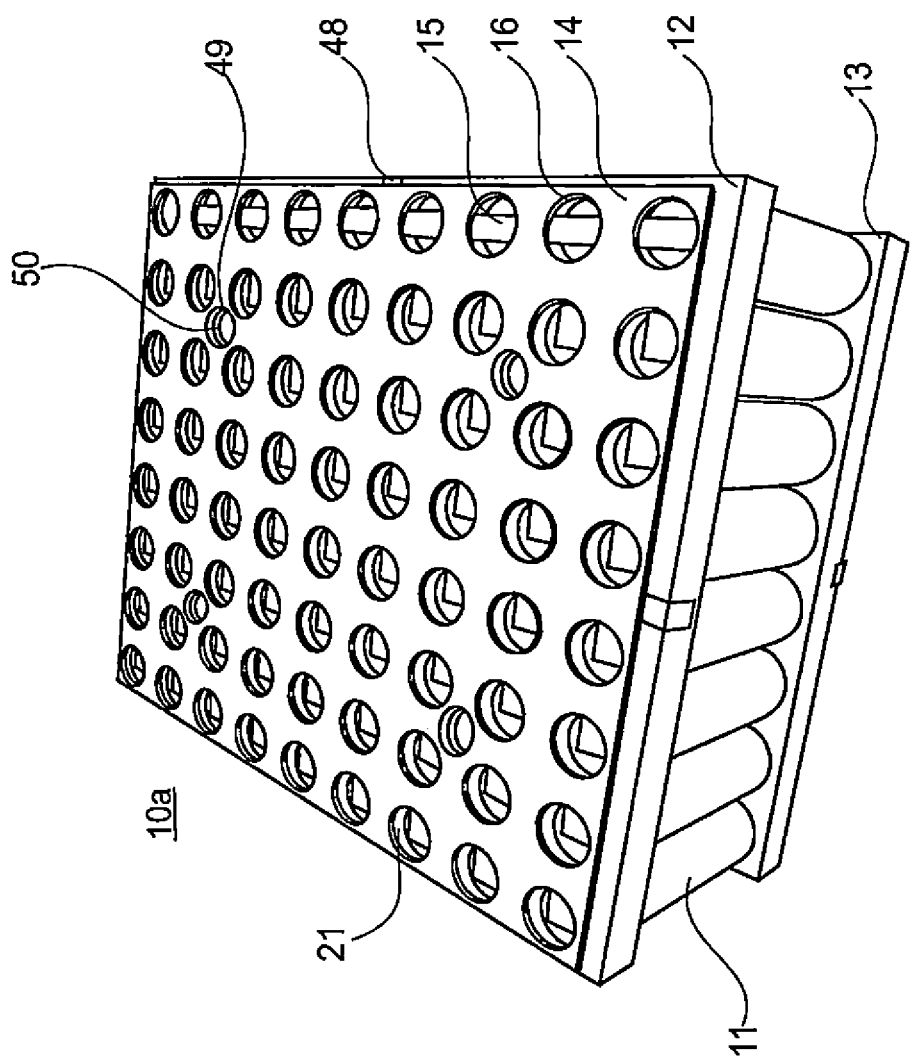
FIG. 6 a perspective view of an alternative battery pack according to the present invention.

In FIG. 6, a perspective view of a battery pack 10a according to the invention is illustrated. Similar to FIG. 1, it can be seen that the connection elements 15 are arranged between the connection structure 14 and the respective holding structure 12 and protrude into the respective contact openings 16 and the receiving opening 21 of the holding structure 12 in order to thereby be connected to the connection terminals 33, 34 of the battery cells 11 not shown here. Further, the battery pack 10a according to FIG. 6 shows that the connection structure 14 has passage openings 50 that have a greater diameter than the passage openings 49 of the underlying holding structures 12, 13. The terminals 48 for the BMS may be placed around an edge of the holding structure 12, 13.

Figure 7:
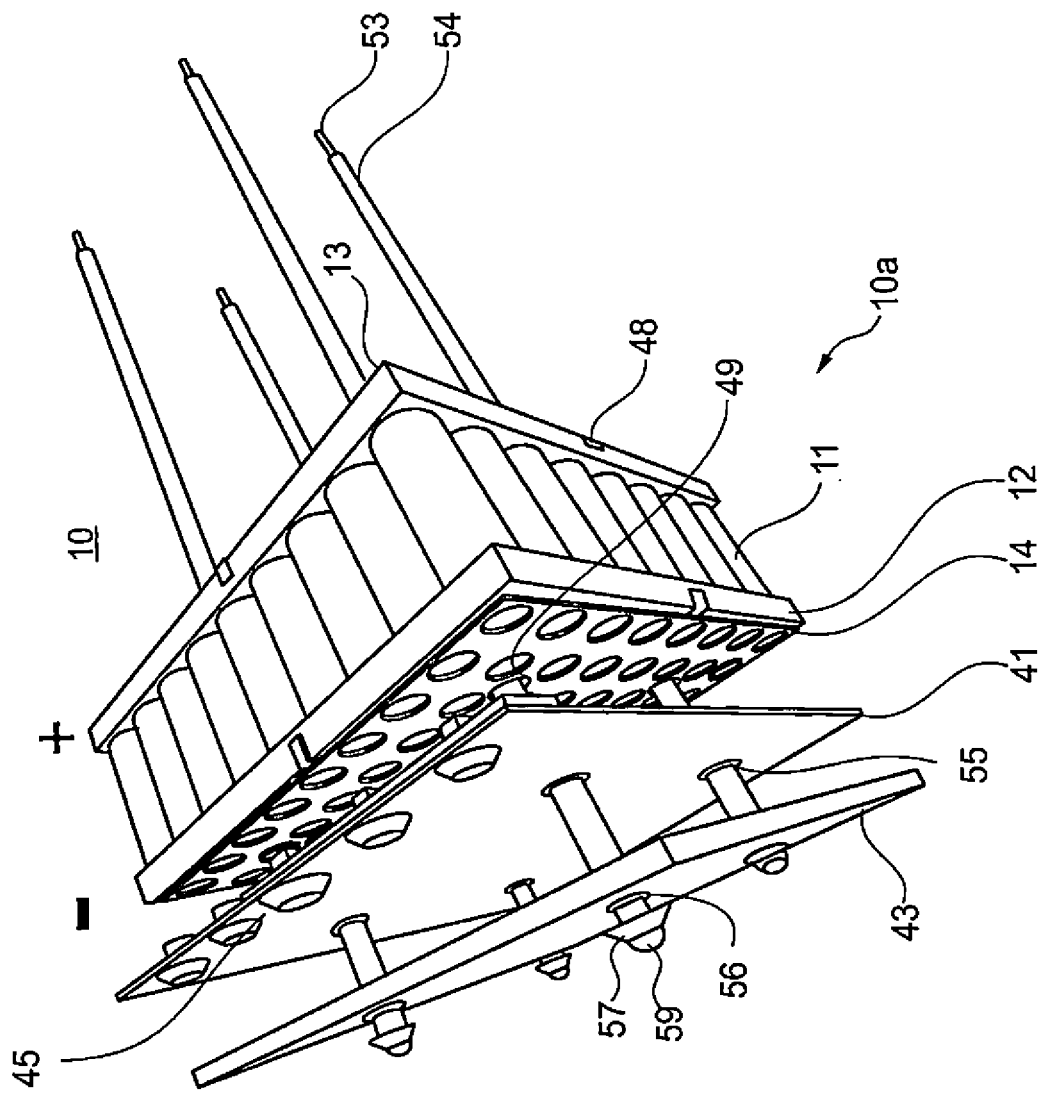
FIG. 7 a perspective view for illustrating the assembly of a battery block according to the invention.

In FIG. 7, an assembly of a battery block 10 according to the invention is illustrated, wherein, in this illustration, only one battery pack 10a has been assembled. A battery block 10 according to the invention comprises a pressure plate 43 that has passage openings 56 for receiving pressing rods 53 which are surrounded by an electrically insulating coating 54. At the end of a pressing rod 53, there is provided a screw head 59 or a nut 58 and a disc spring 57 in order to prevent a slipping of the pressing rod 53 through the passage opening 56.

As illustrated in FIG. 7, after the four pressing rods 53 have been passed through the pressure plate 43, an electrically conductive contact plate 41, made from copper for example, is arranged on the pressing rods 53 and moved toward the pressure plate 43. At the same time, the pressing rods 53 pass through or penetrate the passage openings 55 of the contact plate 41. The contact plate 41 protrudes from the pressure plate 43 at least on one side in order to form an electrical contact region 45 of the battery block. After the contact plate 41 has been arranged on the pressure plate 43, a first battery pack 10a according to FIG. 6 is arranged on the pressing rods 53 and moved in direction of the contact plate 41. Here, the pressing rods 53 with the respective coating 54 also pass through or penetrate the passage openings 49 of the connection structure 14 and the passage openings 50 of the holding structure 12 or 13 of each of the left and right side of the battery pack 10a according to FIG. 7.

Figure 8:
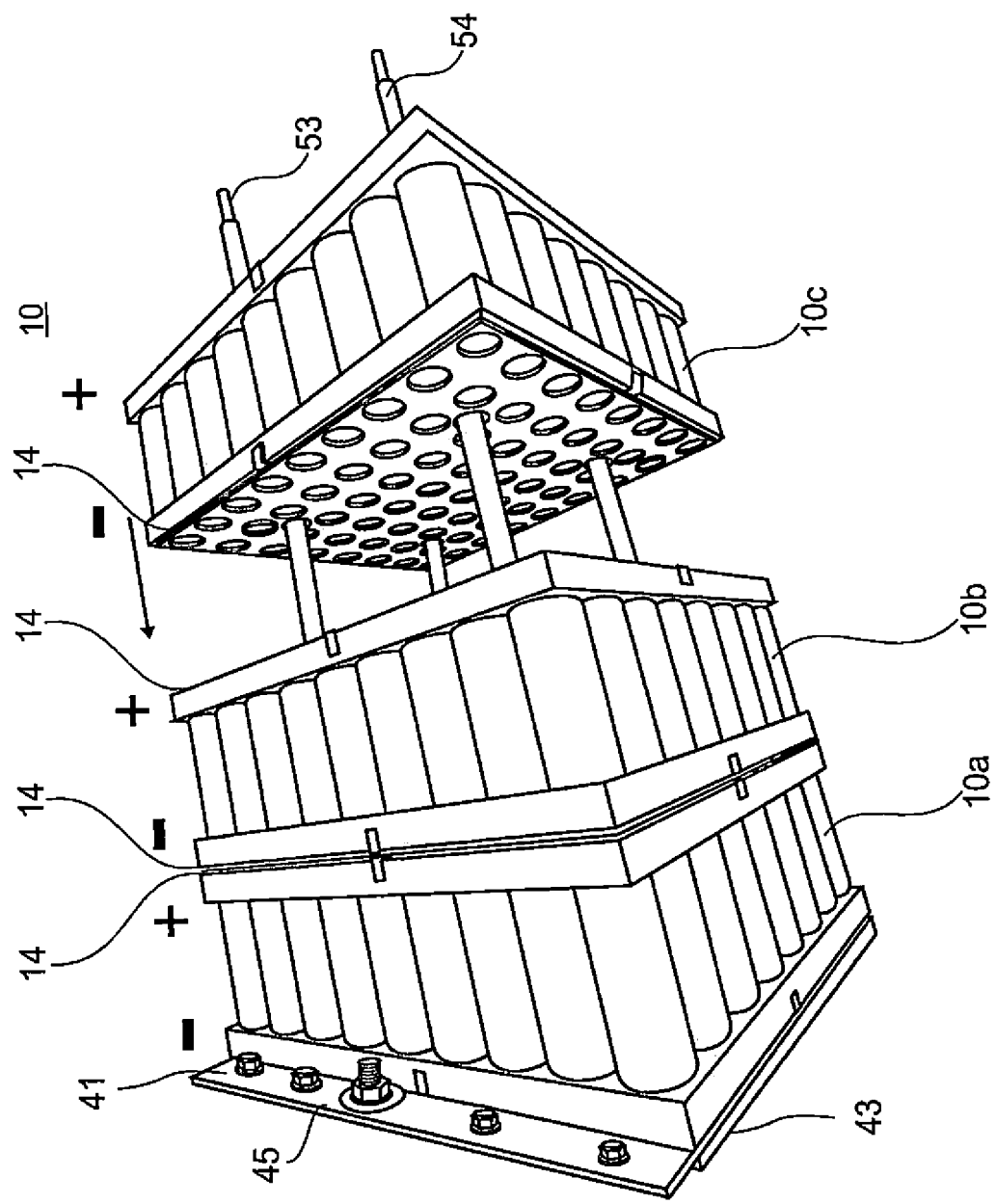
FIG. 8 a further perspective view of the assembly of a battery pack.

A further progress of the assembly of the battery block 10 can be seen in FIG. 8. Two battery packs 10a, 10b have already been arranged on the pressing rods 53, wherein a third battery pack 10c is already arranged on the pressing rods 53 and is being moved toward the battery packs 10a, 10b that have already been mounted. The battery packs 10a, 10b, 10c are electrically connected in series, i.e. the battery cells 11 each are arranged in the battery packs 10a, 10b, 10c such that all electrically positive connection terminals 33 are oriented toward a connection structure 14 and the electrically negative connection terminals 34 are oriented toward the opposite connection structure 14.

As illustrated in FIG. 8, a third battery pack 10c is moved toward a second battery pack 10b, wherein the positive terminal of the third battery pack 10c is moved toward the corresponding negative terminal of the second battery pack 10b such that the connection structures He against each other in a flat and full covering manner and a best possible and large area contact between the two battery packs 10b, 10c is made possible without using further cables or requiring further connection structures.

The sequential stringing together of battery packs according to the invention avows for a very space-efficient arrangement of battery cells. Moreover, since the respective positive and negative connection structures 14 of the individual battery packs 10a, 10b, 10c lie against each other in a flat and large area manner, an extensive and large area electrical connection is possible that has a low development of heat during the current flow, whereby an optimal thermal design of the battery block is ensured.

Figure 9:
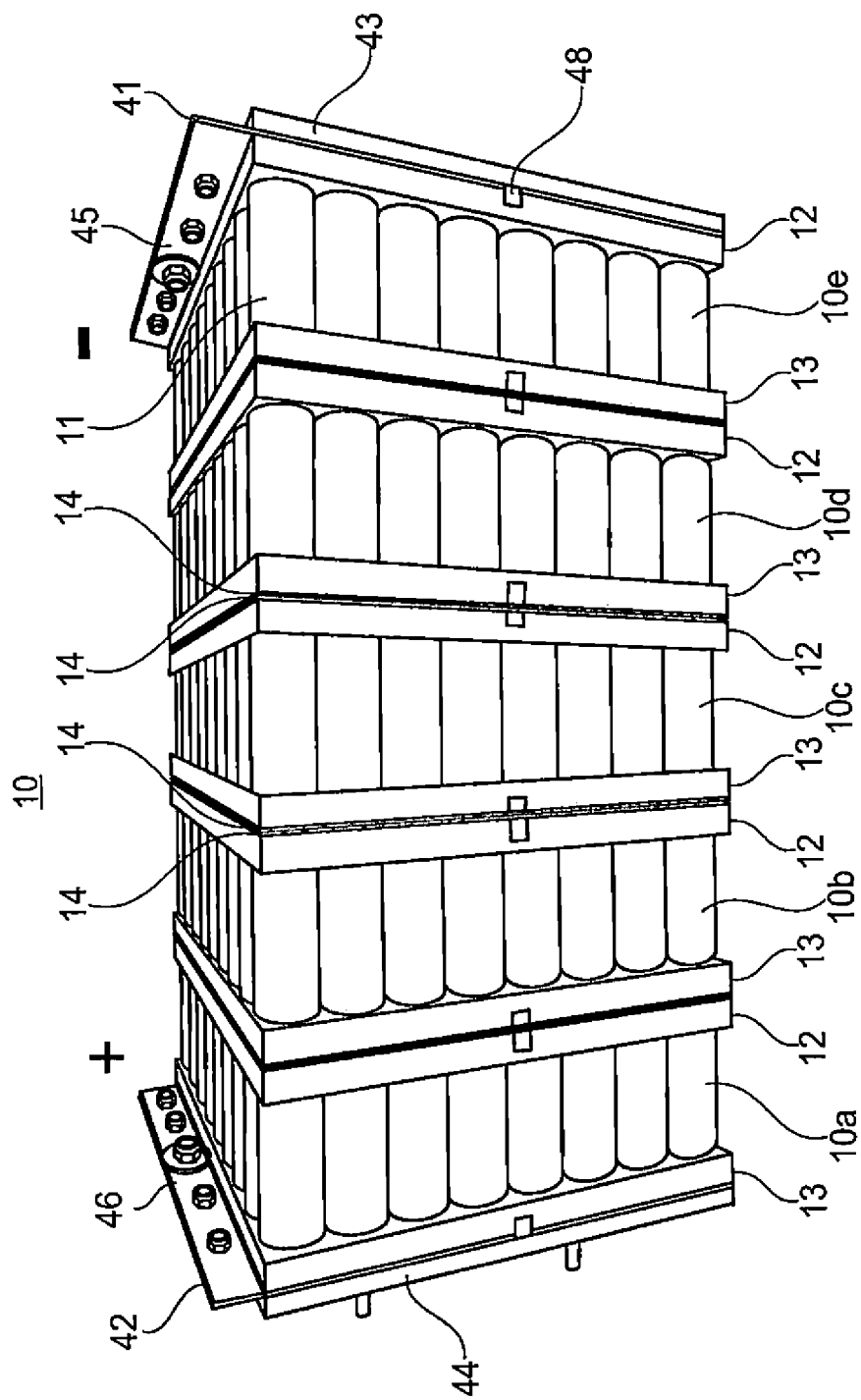
FIG. 9 a battery block according to the invention.

In FIG. 9, a completely assembled battery block 10 is illustrated which has been assembled from five individual battery packs 10a, 10b, 10c, 10d and 10e. Each battery pack 10a, 10b, 10c, 10d and 10e is limited on its left and right &de by a connection structure 14. The battery packs 10a to 10e are limited on the respective outer sides of the first and fifth battery packs 10a, 10e by a contact plate 41 and 42 each of which is limited from outside by a pressure plate 43 and 44. This battery block 10 is compressed, as shown in FIGS.

7 and 8, by four pressing rods 53 with a respective coating 54. To this purpose, the pressing rods 53 are provided with screw threads at their end portions which allow that that a nut 58 is arranged and the pressing rods 53 are tightened such that a corresponding pressure is applied to the battery packs 10a-10e and a reliable electrical connection between the individual connection structures 14 is enabled. The connection regions 45 and 46 of the contact plates 41, 42 each protrude from the outer dimensions of the battery pack 10a, 10e and the pressure plates 43, 44 or protrude upwards.

Figure 10:
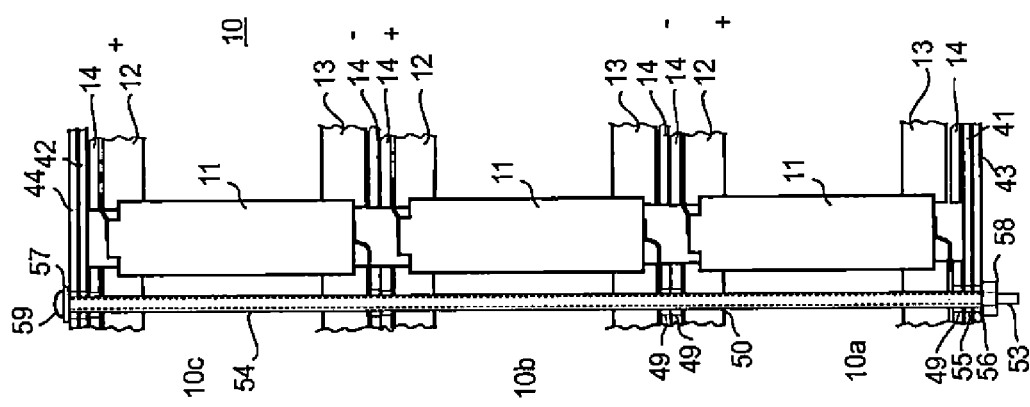
FIG. 10 a sectional view through a battery block according to the invention which illustrates the insertion of battery cells in the individual battery packs and their fastening according to the invention.

In FIG. 10, a sectional view of a battery block according to the invention is illustrated. Here, three different battery packs 10a, 10b, 10c are arranged together which and are pressed against each other by a pressing rod 53 in the sectional view according to FIG. 10. On the upper sides and the lower sides of the upper and lower battery packs 10a, 10c, corresponding contact plates 41 and 42 and corresponding pressure plates 43 and 44 are arranged.

Figure 11:
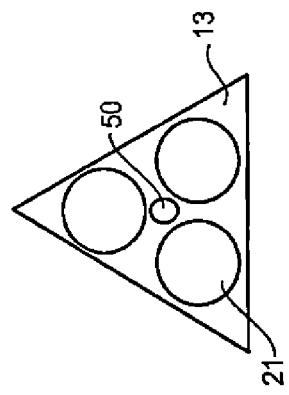
FIG. 11 an alternative embodiment of a holding structure.
Figure 12:
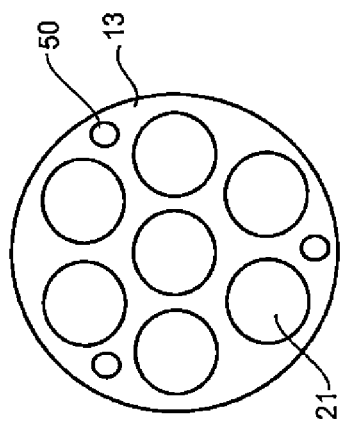
FIG. 12 another alternative embodiment of a holding structure.

The FIGS. 11 and 12 illustrate alternative forms of holding structures. In FIG. 11, for example, a triangular form of a holding structure 13 is illustrated. As can be seen from FIG. 11, it is possible to form an arrangement of this sort with only one pressing rod. In case of an arrangement of this sort of the holding structure 13, the connection structures 14 preferably also have a corresponding shape or form which, however, has slightly smaller outer dimensions such that the connection structures 14 do not protrude from the outer rim or edge of the holding structure 13 and therefore prevent an electrical contact of a connection structure 14 with other electrically conductive materials. This holding structure 13 has 3 receiving openings 21 for receiving battery cells 11 and a passage opening 50 for receiving a pressing rod.

As alternative to FIG. 11, in FIG. 12, a round or circular holding structure 13 is illustrated which provides seven receiving openings 21 in which seven battery cells 11 can be inserted. Preferably, a holding structure 13 of this sort is held together by three pressing rods which are passed through three passage openings 50. Here, the connection structures 14 may also have a circular structure which, however, would have a smaller diameter than the diameter of the respective holding structure 13.

Figure 13:
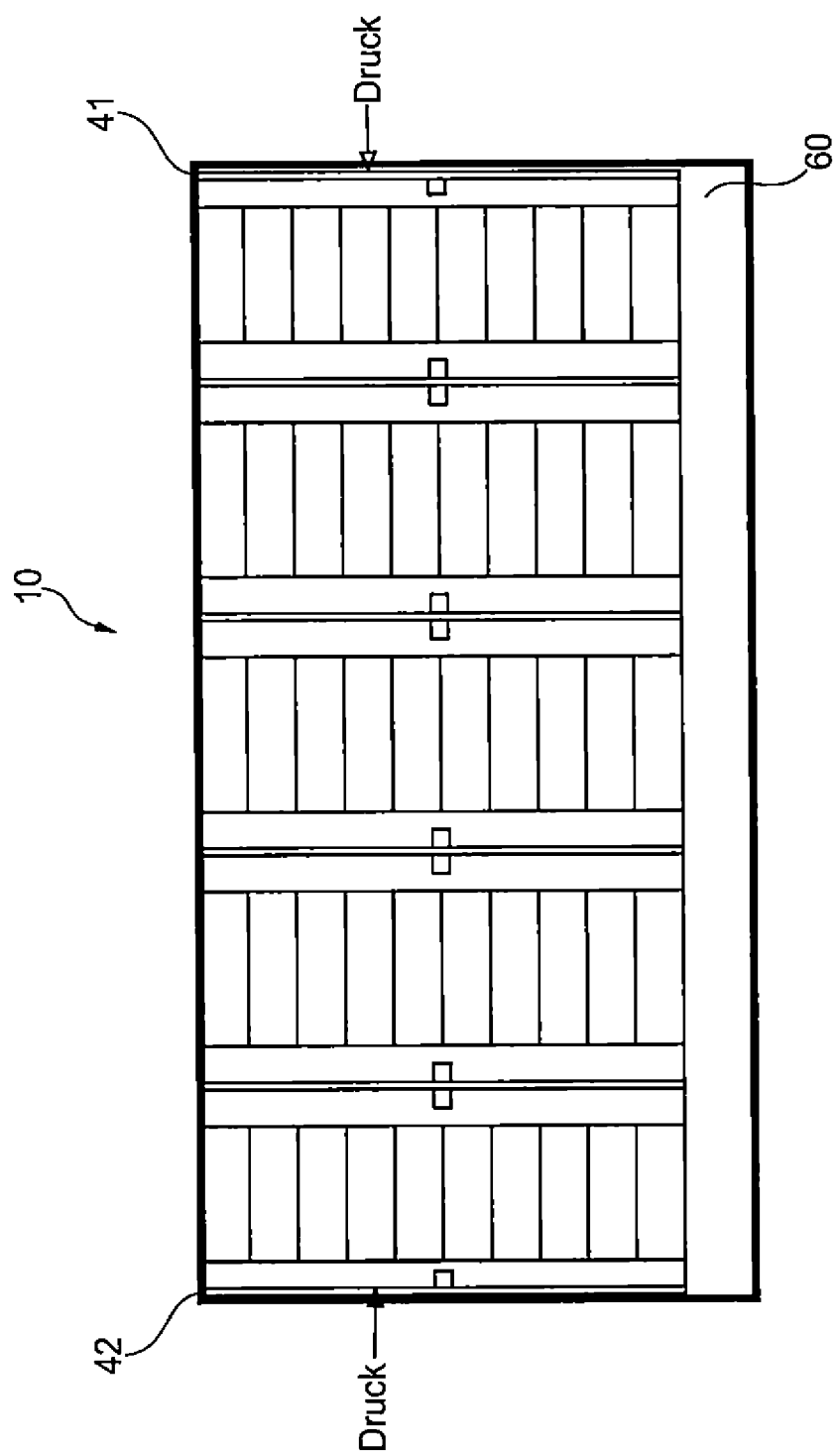
FIG. 13 an alternative embodiment of a battery block in a prefabricated housing.

In FIG. 13, an alternative embodiment of a battery block is illustrated. As alternative to the usage of pressing rods 53 with their coating 54, it is also possible to arrange a plurality of battery packs 10a-10e in prefabricated or predetermined housings 60, wherein the outer shape of the housings realizes the corresponding contact pressure between the individual battery packs 10a-10e such that it is not necessary to use additional pressing rods 53.

Figure 14:
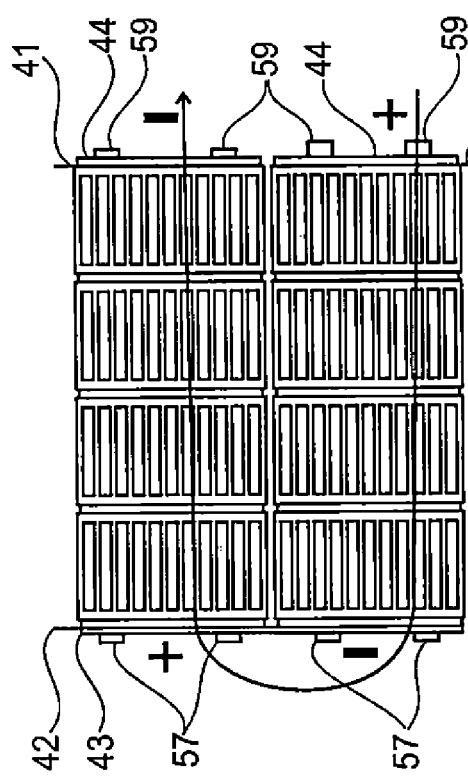
FIG. 14 an illustration of an assembly of multiple battery blocks according to the invention.

In FIG. 14, an interconnection of two battery blocks 10 is illustrated. Here, respectively four battery packs 10a-10d per battery block 10 are connected in line. By means of a contact plate 42, it is possible to arrange an upper battery block 10 on a lower battery block 10, wherein, here, the negative terminal of the lower battery block 10 is connected to the positive terminal of the upper battery block via a common contact plate 42. On the right side of the upper battery block 10, the negative terminal of the upper battery block 10 is provided. Hence, it is possible to allow a corresponding stacking of different battery blocks 10 in an extremely reduced volume.

Figure 15:
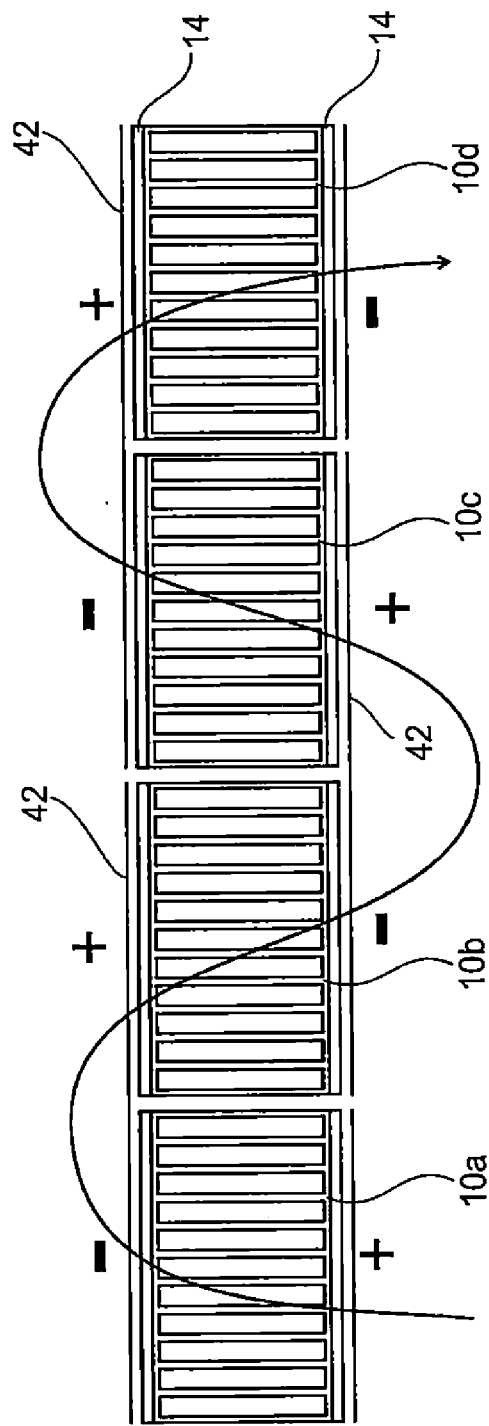
FIG. 15 an alternative assembly of battery packs according to the invention.

An alternative arrangement of battery packs 10a to 10d is illustrated in FIG. 15. Here, the battery packs 10a to 10d according to the invention are arranged next to each other such that the connection structures 14 of neighboring battery packs 10a 10b are connected together by means of a common contact plate 42 and therefore achieve a greatest possible contact surface and ensure an optimal current flow.

Hence, a battery block is provided here that comprises a plurality of battery packs, wherein the electrically positive and the electrically negative connection terminals of the battery cells of a battery pack are arranged at opposite sides of the battery pack and an electrically conductive connection structure is provided on each of the two sides and is connected to the respective electrical connection terminals of the battery cells of a battery pack, wherein two neighboring battery packs each are arranged such that the electrical connection terminals of the cells of neighboring battery packs being oriented toward one side are electrically polarized in an opposite way, wherein a common contact plate extends over the connection structures of the neighboring battery packs on one side of the battery block and the connection structures having electrically opposite polarities are connected in series.

The features described in connection with above embodiments may also be assigned to this embodiment. Hence, a battery block, in which the individual battery packs are arranged adjacent to each other, i.e. in which the longitudinal axes of the battery cells 11 of neighboring battery packs 10a, 10b are arranged in parallel to each other, may comprise holding structures 12, 13, pressure plates 43, 44, pressing mechanisms 53 etc.

A particular advantage of the embodiment described above is that, due to the flat and large area connection structures and holding structures, an optimal current flow is achieved that is not affected by additional electrical connections or tapering cross-sectional areas.

The invention claimed is:

1. A battery block, comprising:
at least two battery packs, wherein each battery pack comprises at least two battery cells, each battery cell being formed as a round cell;
wherein each battery cell of the battery pack has an electrically positive connection terminal on one side of the battery pack and an electrically negative connection terminal of the battery cell on the opposite side of the battery pack;
wherein a first connection structure is arranged at an outermost side of the battery pack having the electrically positive connection terminals of the battery cells and a second connection structure is arranged at an opposite outermost side of the battery pack having the electrically negative connection terminals of the battery cells;
wherein each electrically positive connection terminal of the battery cells is connected to the first connection structure of the battery pack by a strip formed connection element, respectively, and each electrically negative connection terminal of the battery cells is connected to the second connection structure by a strip formed connection element, respectively,
wherein the connection elements are fixed to a side of the first and second connection structure respectively facing the battery cells connected to the connection elements,
wherein the first connection structure and the second connection structure each have a flat plate shape without any further protruding connection structure to define a large area electrical connection, and
wherein the connection structures of two neighboring battery packs having opposite electrical polarities lie directly against each other in a fully covering manner in order to achieve the large area electrical connection between the battery packs.

2. The battery block according to claim 1, wherein the battery packs are connected in series and wherein electrically opposite connection terminals of the battery cells are arranged at the opposite outer sides of the battery block.

3. The battery block according to claim 1, wherein the battery packs of the battery block are pressed against each other by pressure on the outer battery packs, and at least one pressing mechanism is provided for pressing the battery packs against each other.

4. The battery block according to claim 3, wherein the at least one pressing mechanism is formed as a pressing rod, and fastening means for fastening are arranged at the at least one pressing rod and by means of which the at least two battery packs are pressable against each other.

5. The battery block according to claim 4, wherein the connection structures of the battery pack each have at least one passage opening for receiving the at least one pressing rod.

6. The battery block according to claim 1, wherein a contact plate is associated to each of the two outermost connection structures of the outer battery packs lying together, the contact plate comprising a connection region for connecting the battery block to a charging device or to an electrical load.

7. The battery block according to claim 6, wherein the contact plate protrudes from the battery pack and the contact region lies outside the surface of the connection structure.

8. The battery block according to claim 6, wherein the contact plate has at least one passage hole for receiving at least one pressing rod.

9. The battery block according to claim 1, wherein an electrically insulating pressure plate is arranged at each of two outer sides of the battery pack.

10. The battery block according to claim 9, wherein the pressure plate at least has a passage hole for receiving at least one pressing rod.

11. The battery block according to claim 1, wherein a first holding structure is arranged on the side of the electrically positive connection terminals of the battery cells and a second holding structure is arranged on the side of the electrically negative connection terminals of the battery cells for receiving the at least two battery cells, wherein the holding structure has a surface by which the connection structure is supported, wherein the holding structure comprises connection openings and at least one passage opening.

12. The battery block according to claim 11, wherein the passage opening in the holding structure has a smaller diameter than a passage opening in the connection structures.

13. The battery block according to claim 1, wherein the connection structure comprises a surface corresponding to at least the sum of the cross-sectional areas of the battery cells comprised in the battery pack.

14. The battery block according to claim 1, wherein the length of a connection structure in a longitudinal direction is greater than the sum of the individual lengths or individual diameters of the battery cells in said longitudinal direction.

15. The battery block according to claim 1, wherein the width of a connection structure in a width direction is greater than the sum of the individual widths or individual diameters of the battery cells in said width direction.

16. The battery block according to claim 11, wherein the battery cells of a battery pack are mounted in the first and second holding structure, wherein the first and second holding structure are mounted to each other by means of a first fastening element.

* * * * *